United States Patent
Sayers

(10) Patent No.: US 7,017,916 B2
(45) Date of Patent: Mar. 28, 2006

(54) SHAFT SEAL ASSEMBLY AND ITS ASSOCIATED METHOD OF MANUFACTURE

(76) Inventor: David Sayers, 1947 Stout Dr., Unit B, Warwick, PA (US) 18974

( * ) Notice: Subject to any disclaimer, the term of this patent is extended or adjusted under 35 U.S.C. 154(b) by 9 days.

(21) Appl. No.: 10/384,043

(22) Filed: Mar. 10, 2003

(65) Prior Publication Data

US 2005/0173866 A1    Aug. 11, 2005

(51) Int. Cl.
*F16J 15/16* (2006.01)
(52) U.S. Cl. .................. 277/543; 277/546; 277/548
(58) Field of Classification Search ............. 277/543, 277/546, 547, 548, 584
See application file for complete search history.

(56) References Cited

U.S. PATENT DOCUMENTS

| | | | | |
|---|---|---|---|---|
| 821,100 | A * | 5/1906 | Hoyer | 277/548 |
| 1,169,583 | A * | 1/1916 | Van Devort | 277/548 |
| 1,232,028 | A * | 7/1917 | Harris | 277/547 |
| 2,397,753 | A * | 4/1946 | Sale | 277/356 |
| 2,799,523 | A * | 7/1957 | Parker | 277/449 |
| 2,956,824 | A * | 10/1960 | Kuchler et al. | 277/500 |
| 3,124,502 | A * | 3/1964 | Radke | 428/66.4 |
| 3,582,093 | A * | 6/1971 | Lucien | 277/434 |
| 3,930,657 | A * | 1/1976 | Svensson et al. | 277/584 |
| 4,052,112 | A * | 10/1977 | Faber | 384/16 |
| 4,576,386 | A * | 3/1986 | Benson et al. | 277/584 |
| 4,840,379 | A * | 6/1989 | Thoman, Jr. | 277/584 |
| 5,879,010 | A * | 3/1999 | Nilkanth et al. | 277/545 |
| 6,805,356 | B1 * | 10/2004 | Inoue | 277/355 |

* cited by examiner

Primary Examiner—Alison K. Pickard
(74) Attorney, Agent, or Firm—LaMorte & Associates

(57) ABSTRACT

A system and method of manufacturing improved wear ring assemblies and positive pressure shaft seals. The wear ring assemblies are made from stacked layers of flat metal. Different shaped component parts of the wear ring assemblies are cut from various sheets of metal. The component parts are stacked to form different sections of the wear ring assemblies. The stacked component parts are welded or otherwise bound together. The resulting sections of the wear ring assemblies are then assembled to form the annular structure of a full wear ring assembly. The result is a wear ring assembly that is both easy and inexpensive to produce.

7 Claims, 5 Drawing Sheets

SHAFT SEAL ASSEMBLY AND ITS ASSOCIATED METHOD OF MANUFACTURE

BACKGROUND OF THE INVENTION

1. Field of the Invention

In general, the present invention relates to the structure of seals that are used around rotating shafts. More particularly, the present invention relates to the manner and method by which such shaft seals are manufactured.

2. Description of the Prior Art

The prior art is replete with machines, equipment and component parts that require a seal be formed around a rotating shaft. As such, over the years, many shaft seal designs have been developed for a wide array of rotating shaft applications. Many shaft seals, such as those used on automobile engines are designed as part of the engine and are actively lubricated and cooled by the running of the engine. However, in many applications, shaft seals are needed in isolated applications where active lubrication and cooling are either not available or are not desirable.

Two of the most common families of isolated shaft seal designs are packed seals and positive pressure seals. Typically, neither packed seals nor positive pressure seals require active lubrication or cooling. A packed seal is the type of shaft seal used in most plumbing valve fixtures. With a packed seal, packing material is placed around the shaft and the packing material is compressed against the shaft until the packing material is so dense that foreign material cannot pass through the packing material. Such shaft seal designs work well but add significant friction to the rotating shaft. Accordingly, such shaft seals are typically only used with shafts that turn only on occasion or rotate at very low speeds. If such packed seals were used on shafts that turn quickly, the friction would rapidly heat the seal to a point where the seal or shaft would fail.

Positive pressure shaft seals add much less friction to a rotating shaft than do packed seals. Accordingly, positive pressure seals can be run at much higher shaft rotation speeds without concerns of friction heat causing the seal to fail.

Referring to FIG. 1, a typical prior art positive pressure seal assembly 10 is shown. In the prior art, an elastomeric seal 12 is clamped directly onto a rotating shaft 14. The elastomeric seal 12 is interposed between two wear rings 16 that have smooth external faces. The wear rings 16 and the elastomeric seal 12 are placed in an annular housing 18, wherein the interior of the housing 18 is kept above ambient pressure. As the shaft 14 turns, the elastomeric seal 12 on the shaft 14 turns, as do the wear rings 16 surrounding the elastomeric seal 12. The wear rings 16 move against the interior of the housing 18. Foreign material is prevented from entering the seal by the contact of the wear rings 16 against the interior of the housing 18 and the positive pressure within the housing 18.

Although positive pressure shaft seals have many advantages over packed seals, they tend to be significantly more expensive than simple packed seals. One of the most extensive elements in a positive pressure shaft seal is the wear ring. The wear rings are typically machined from solid blanks of stainless steel. Each wear ring has a complex internal configuration that enables the wear ring to engage and retains the elastomeric seal. Furthermore, the wear rings have external surfaces that must be polished smooth to reduce wear friction. It is the cost of properly manufacturing the wear rings that often is a limiting factor in economically producing positive pressure shaft seals.

A need therefore exists for an improved way to produce wear rings in a positive pressure shaft seal that reduces both the cost and complexity of manufacture. This need is met by the present invention as described and claimed below.

SUMMARY OF THE INVENTION

The present invention is a system and method of manufacturing improved wear ring assemblies and the positive pressure shaft seals that utilize the improved wear ring assemblies. The wear ring assemblies are made from stacked layers of flat metal. Different shaped component parts of the wear ring assemblies are cut from various sheets of metal. The component parts are stacked to form different sections of the wear ring assemblies. The stacked component parts are welded or otherwise bound together. The resulting sections of the wear ring assemblies are then assembled to form the annular structure of a full wear ring assembly. Since the wear ring assemblies are made from cut pieces of flat metal that are bonded together, little or no machining is required to produce the structure of the wear ring assemblies. The result is a wear ring assembly that is both easy and inexpensive to produce.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE INVENTION

Figure 1:
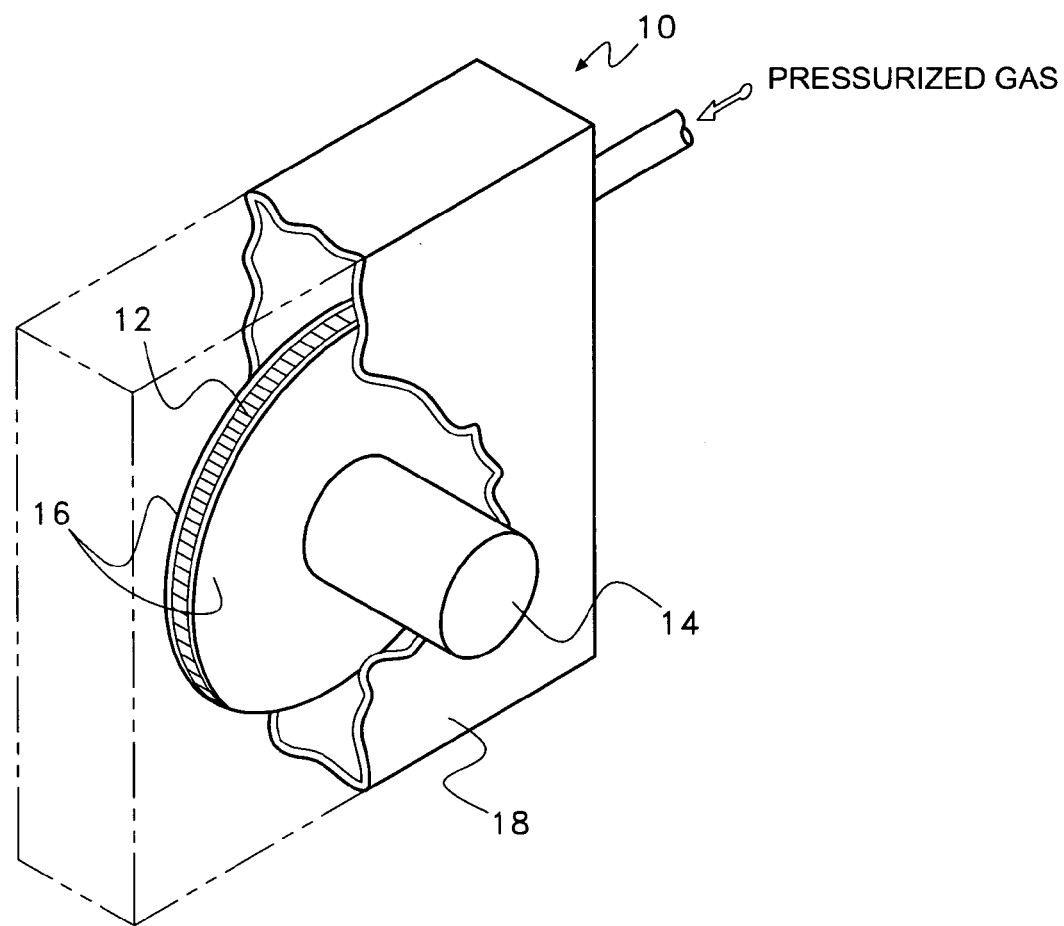
FIG. 1 is a partially fragmented perspective view of a prior art positive pressure shaft seal.
Figure 2:
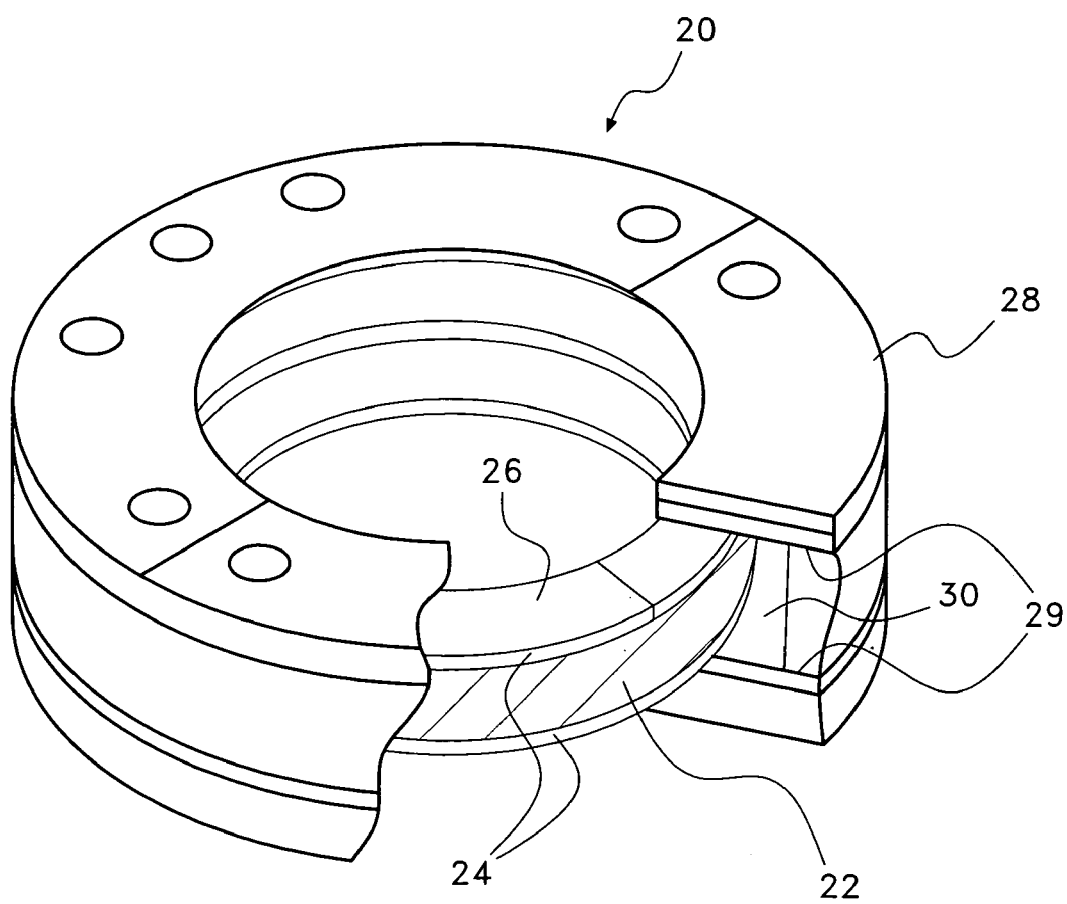
FIG. 2 is a partially fragmented perspective view of a positive pressure shaft seal in accordance with the present invention.

Referring to FIG. 2, a positive pressure shaft seal assembly 20 is shown in accordance with the present invention. The shaft seal assembly 20 contains an elastomeric seal 22 that is clamped around a rotating shaft. The elastomeric seal 22 is interposed between two opposing wear ring assemblies 24. As will be later explained, the wear ring assemblies 24 are not machined from a solid blank of metal, but are rather assembled out of component pieces.

Each wear ring assembly 24 has a face surface 26 that is smooth. The wear ring assemblies 24 and the elastomeric seal 22 are placed within a housing 28. The housing 28 has interior surfaces 29 that abut against the face surfaces 26 of the wear ring assemblies 24. The interior surfaces 29 of the housing 28 can be polished metal or can be lined with a low friction bearing material such as Teflon, Surlyn or Kevlar.

The housing 28 of the shaft seal assembly defines an interior chamber 30 that communicates with a pressurized gas source. Accordingly, the pressure within the housing 28 is maintained at a level higher than that of the pressure surrounding the exterior of the housing 28.

Figure 3:
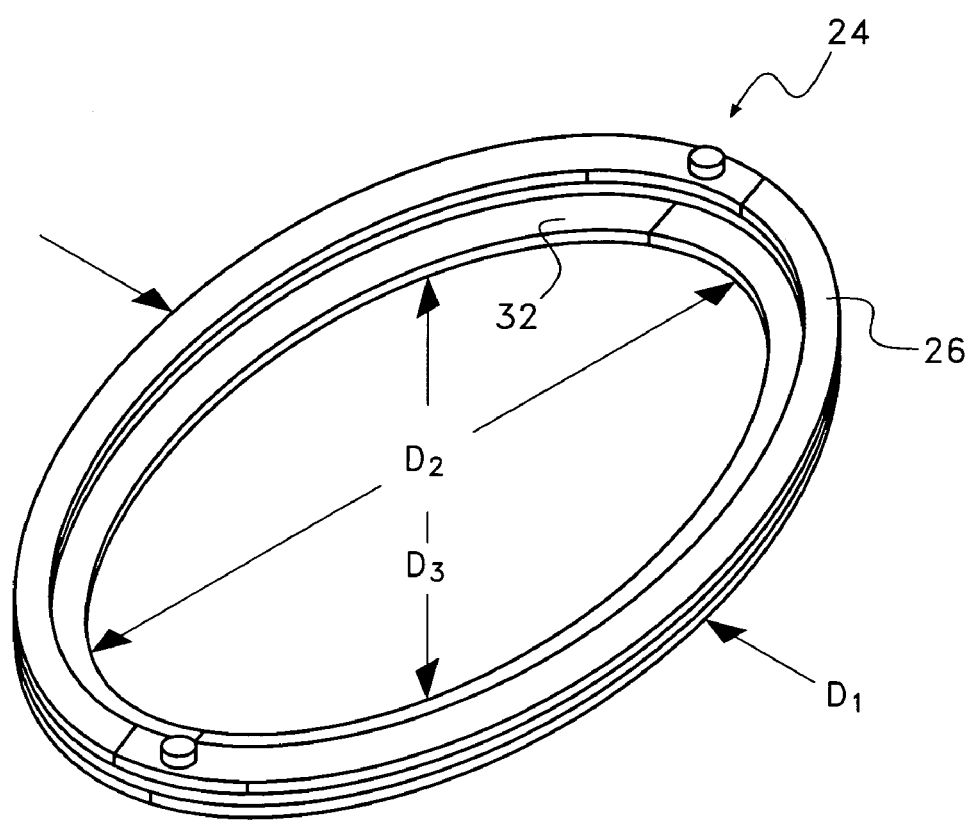
FIG. 3 is a perspective view of a wear ring assembly in accordance with the present invention.

Referring to FIG. 3, it can be seen that the wear ring assembly 24 is a complex annular structure. The face surface 26 of the wear ring assembly 24 has an outside diameter D1 and an inside diameter D2. A cylindrical wall 32 extends upwardly from the peripheral edge of the back of the face surface 26. However, although the cylindrical wall 32 has the same outside diameter D1 as does the face surface 26, the cylindrical wall 32 has an inside diameter D3 that is larger than that of the inside diameter D2 of the face surface 26. The result is a ledge structure where the interior of the face surface 26 creates the base of a ledge structure and the interior of the cylindrical wall 32 creates the sides of the ledge structure. The existence of this ledge structure is necessary for the wear ring assembly 24 to properly engage and retain the elastomeric seal 22(FIG. 2).

Figure 4:
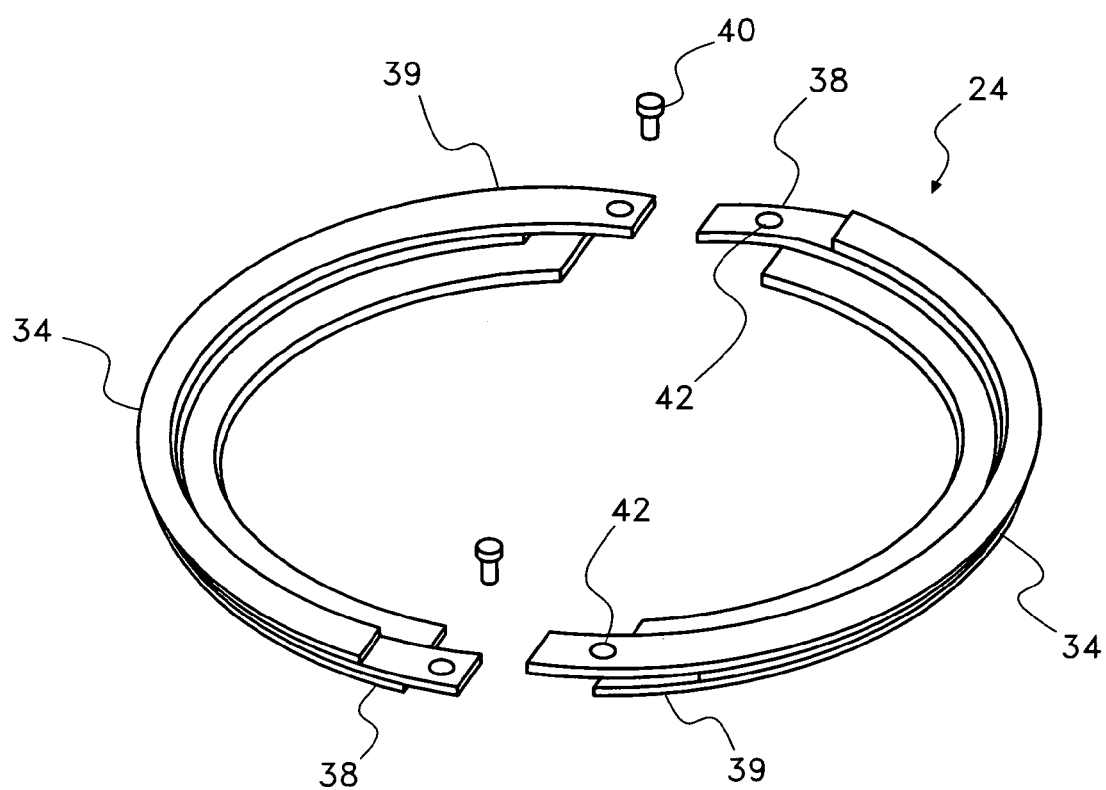
FIG. 4 is an exploded view of the embodiment of the wear ring assembly shown in FIG. 3.
Figure 5:
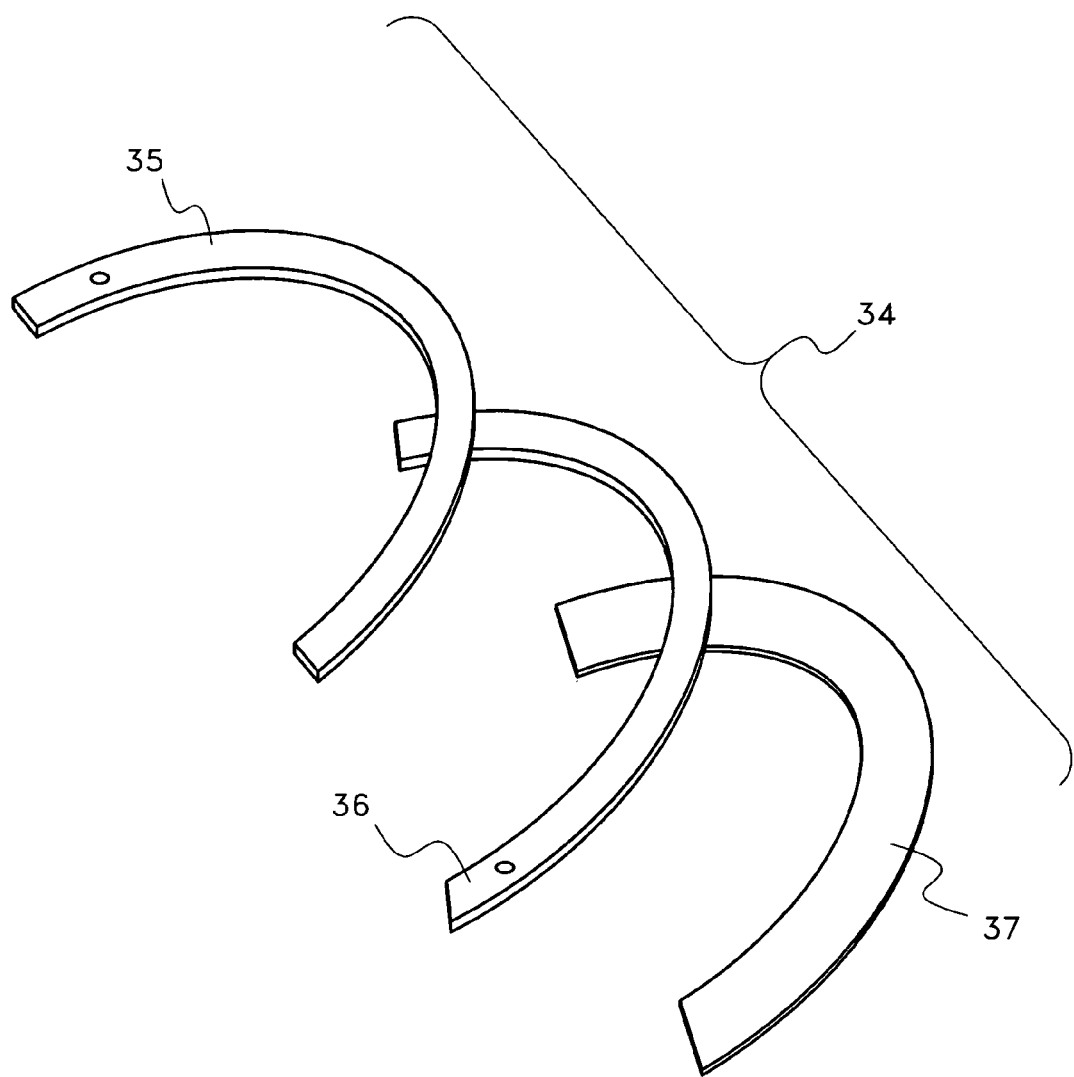
FIG. 5 is an exploded view of a subassembly of the wear ring assembly in accordance with the present invention.

Referring to FIG. 4, it can be seen that each of the ring assemblies 24 is comprised of two interconnected subassemblies 34. Each subassembly 34 is a semi-annular structure comprised of a plurality of stacked elements 35, 36, 37 (FIG. 5). Each of the three stacked elements is, itself, semi-annular. However, the position of each of three stacked elements is staggered. This causes the two ends 38, 39 of each subassembly 34 to form half of a finger lap joint. When two subassemblies 34 are connected, the ends 38, 39 of the staggered layers intermesh and complete the annular shape of the wear ring assembly 24. The structure of the two subassemblies 34 is identical. Accordingly, each of the two subassemblies 34 can be manufactured in the same manner using identical processes, parts and tooling.

The two subassemblies 34 are held together by set screws 40 that pass through some of the layers in the ends 38, 39 of the subassemblies 34 that intermesh. Screw holes 42 are formed in the ends 38, 39 of the subassemblies 34. The screw holes 42 only properly align when the two subassemblies 34 are correctly intermeshed. Consequently, when the set screws 40 are set in place, a person can be assured that the full wear ring assembly 24 has been assembled properly.

Referring to FIG. 5, it can be seen that each ring subassembly 34 is made from three stacked ring layers 35, 36, 37. The first layer 35 forms the face surface 26 (FIG. 3)of the each ring subassembly 34. The first layer 35 is semi-annular in shape and is cut from a sheet of polished metal. Sheets of polished metal, such as stainless steel, are readily and inexpensively available for commercial use in different gauges.

The second layer 36 of each ring subassembly 34 and the third layer 37 of each ring subassembly 34 are both cut from a different stock of sheet metal than is the first layer 35. The gauge of the metal used to create the second and the third layers 36, 37 can be thicker than that used to create the first layer 35. Furthermore, the sheet of metal used to create the second and third layers 36, 37 need not have a polished finish.

The second layer 36 and the third layer 37 are semi-annular and have identical dimensions. However, the second and third layers 36, 37 are not uniformly stacked atop the first layer 35. Rather, the first layer 35, second layer 36 and third layer 37 are all staggered. In this manner, the ends of the first layer 35, second layer 36 and third layer 37 terminate at different points. This creates the staggered ends 38, 39 (FIG. 4) of the ring subassemblies 34 that enable the ring subassemblies 34 to intermesh when connected.

The first layer 35, second layer 36 and third layer 37 are preferably made of stainless steel or another corrosion resistance metal. Sheets of the selected metal are provided for the first layer 35, second layer 36 and third layer 37. All three layers 35, 36, 37 can be cut from the same sheet of metal. However, it is preferred that the first layer 35 be cut from a first polished sheet and a second sheet of metal is used to create the second and third layers 36, 37.

In the preferred embodiment, the first, second, and third layers 35, 36, 37 are cut from sheets of metal using a laser cutter or a water abrasion cutter. In this manner, the sheets of metal can be cut to close tolerances and need not be further machined in any secondary operation.

Once the three layers 35, 36, 37 of metal are obtained they are stacked together in the form of the wear ring subassembly 34 (FIG. 4). Once so configured, the three layers 35, 36, 37 are spot welded or otherwise bound together at different points. After the three layers 35, 36, 37 are bound together, the screw holes at the ends of each ring subassembly 34 are drilled and tapped. Once the ring subassemblies 34 are created, they are interconnected and mechanically bound with the set screws 40 to form a complete wear ring assembly 24. The wear ring assembly 24 can then be used to create the overall shaft seal. Since the wear ring assemblies 34 are made from standard sheets of metal and require no complex machining, the cost of the wear ring assemblies 34 is significantly lower than wear ring assemblies currently commercially available. Since the wear ring assemblies are less expensive than prior art alternatives, the completed shaft seal assembly can be manufactured at a cost lower than prior art alternatives.

It will be understood that the embodiment of the present invention shaft seal assembly that is described and illustrated herein is merely exemplary and a person skilled in the art can make many variations to the embodiment shown without departing from the scope of the present invention. For example, the illustrated example shows three layers used to create each subassembly. It will be understood that any plurality of layers can be used. Furthermore, the wear rings shown contain only two subassemblies. It will be understood that any number of subassemblies can be created that assemble together into the annular shape of the wear ring assembly. All such variations, modifications and alternate embodiments are intended to be included within the scope of the present invention as defined by the appended claims.

What is claimed is:

1. A wear ring assembly for use within a positive pressure shaft seal, said wear ring assembly comprising:
   a first semi-annular structure, having two ends;
   a second semi-annular structure having two ends, wherein said first semi-annular structure and said second semi-annular structure are both comprised of a plurality of flat sections of metal stacked atop one another and joined together, and wherein said two ends of said first semi-annular structure and said two ends of said second semi-annular structure interconnect to form an annular wear ring structure, said annular wear ring structure having an annular face surface that has a first inside diameter, and a cylindrical wall extending behind said annular face surface that has a second inside diameter larger than said first inside diameter; and
   mechanical fasteners for fastening said first semi-annular structure and said second semi-annular structure together when forming said wear ring structure.

2. The assembly according to claim 1, wherein said plurality of flat sections of metal stacked atop one another are welded together.

3. The assembly according to claim 2, wherein each of said plurality of flat sections are semi-annular in shape.

4. The assembly according to claim 3, wherein each of said plurality of flat sections are stacked in a staggered configuration.

5. A positive pressure shaft seal device, comprising:

two wear ring assemblies, each of said wear ring assemblies being comprised of a plurality of flat metal pieces stacked and joined together, wherein each said wear ring assemblies includes:
- i. a first semi-annular structure, having two ends;
- ii. a second semi-annular structure having two ends, wherein said two ends of said first semi-annular structure and said two ends of said second semi-annular structure interconnect to form an annular wear ring structure having a flat face surface and a cylindrical wall that extends away from said face surface, and wherein said flat face surface is annular, having a first inside diameter, and said cylindrical wall has a second inside diameter that is larger than said first inside diameter;

an annular elastomeric seal disposed between said wear ring assemblies;

a housing surrounding said wear ring assemblies, wherein said housing defines shaft openings and said wear ring assemblies abut against internal surfaces of said housing around said shaft openings.

6. The device according to claim 5, wherein each of said plurality of flat metal pieces are semi-annular in shape.

7. The device according to claim 6, wherein each of said plurality of flat metal pieces are stacked in a staggered configuration.

* * * * *